Patented Nov. 7, 1939

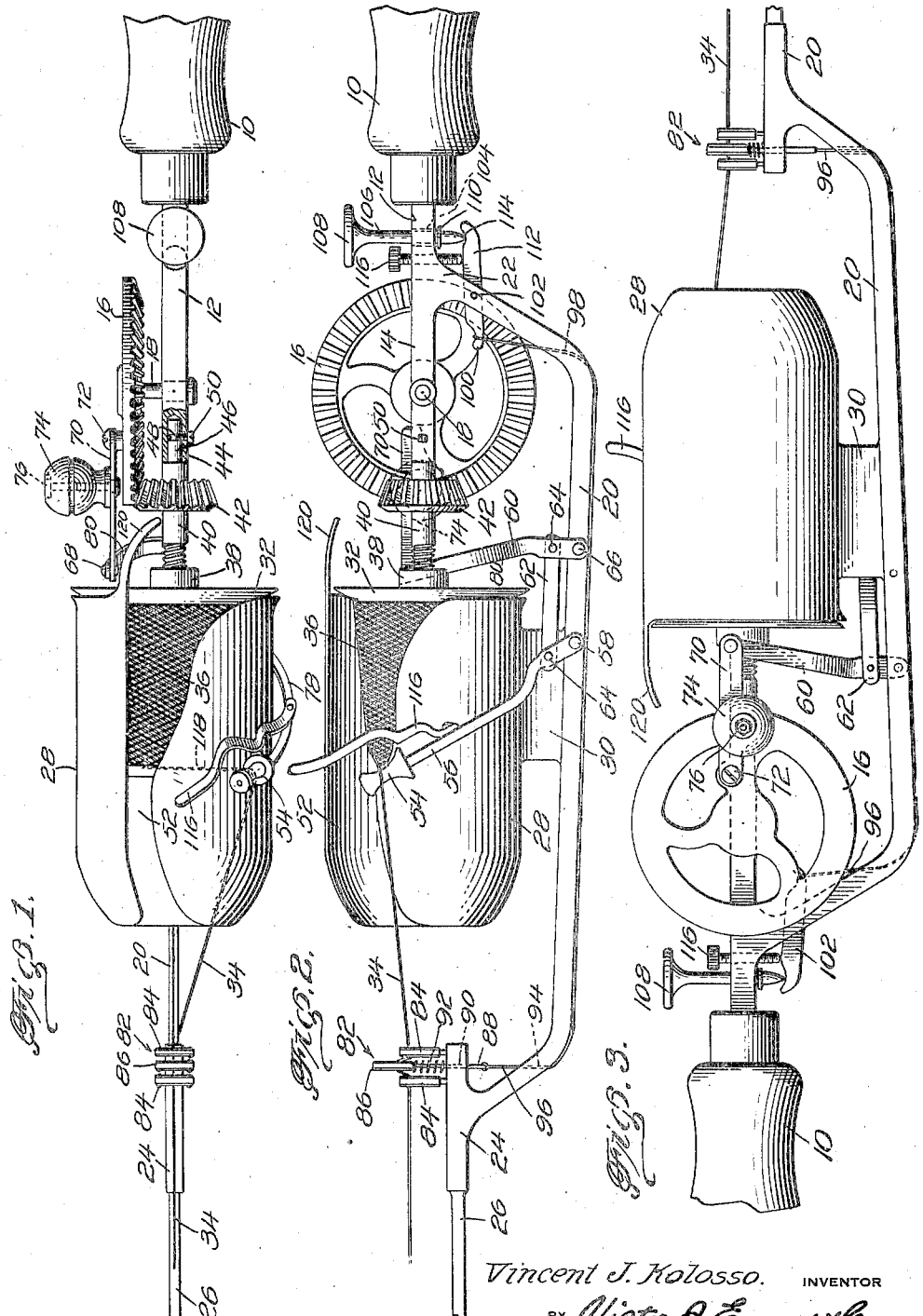

2,179,413

UNITED STATES PATENT OFFICE 2,179,413

FISHING ROD AND REEL

Vincent J. Kolosso, Appleton, Wis.

Application November 9, 1938, Serial No. 239,715

5 Claims. (Cl. 43—20)

My invention relates to fishing rods and reels and has among its objects and advantages an improved construction designed to eliminate back lashing and to lessen friction when casting.

In the accompanying drawing:

Figure 1 is a top plan view of a fishing rod and reel embodying my invention;

Figure 2 is a side view; and

Figure 3 is a view illustrating the other side of the construction when arranged according to Figure 2.

In the embodiment selected to illustrate my invention, I make use of a handle 10 connected with a mount 12. Mount 12 includes a branch 14 on which I rotatably mount a bevel gear 16 through the medium of a shaft 18. An offset bracket 20 is formed integrally at 22 with the mount 12 and includes a head 24 to which the rod 26 is connected. A spool housing 28 is mounted on the bracket 20 through the medium of an interconnecting web 30. Housing 28 has its longitudinal axis in axial alignment with the branch 14. Within the housing 28 I position a spool 32 upon which the line 34 is wound, as indicated at 36. Spool 32 includes a hub 38 having threaded connection with a shaft 40 which carries a bevel pinion 42 arranged in mesh with the bevel gear 16.

I provide the branch 14 with an axial bore 44 within which the reduced extension 46 of the shaft 40 is rotatably mounted. Extension 46 includes a groove 48 within which the inner end of a screw 50 is positioned to restrain the extension from relative longitudinal shifting inside the bore 44. Rotation of the gear 16 imparts rotary motion to the shaft 40 which in turn rotates the spool 32 for winding up the line 34. Housing 28 provides an enclosure for the spool and includes a wide slot 52 through which the line 34 operates. A line guide 54 is secured to one end of a bar 56 pivotally connected at 58 with the bracket 20. Bar 56 pivots about its axis 58 for moving the line guide 54 in an oscillatory path longitudinally of the spool 32 so as to distribute the line 34 thereon as the spool is rotated. Bar 56 is operatively connected with a link 60 through the medium of a connecting link 62.

Connecting link 62 is pivotally connected at 64 with the bar 56 and the link 60, while one end of the link 60 is pivotally connected at 66 with the bracket 20. The opposite end of the link 60 is pivotally connected at 68 with a link 70 pivotally connected at 72 with the gear 16. Pivot 72 is located to one side of the axis of the shaft 18. A knob 74 is mounted on the link 70 through the medium of a bolt 76. It will thus be seen that rotation of the gear 16 through the medium of the knob 74 imparts oscillatory movement to the link 60, which in turn imparts oscillatory movement to the bar 56 because of the interconnecting link 62. Bar 56 is bowed at 78 to accommodate the curvature of the housing 28, while the link 60 is bowed at 80 to bring its one end into proper alignment with the link 70. Upon the head 24 I mount a line check 82. Line check 82 comprises two guides 84 fixedly connected with the head 24 and provided with openings through which the line 34 is threaded. The guide element 86 includes an opening through which the line 34 is threaded and is fixedly connected with a small rod 88 passing freely through the opening 90 in the head 24. Upon the rod 88 and between the head 24 and the guide 86, I mount a compression spring 92 which urges the guide 86 to the position of Figure 2.

Bracket 20 is provided with an opening 94 through which a pull line 96 passes freely. The pull line 96 extends along the bracket 20 and passes through an opening 98 near its opposite end for connection with a lever 100 pivotally connected at 102 to the bracket 20. Mount 12 includes a transverse opening 104 for loosely receiving a pin 106 having a head 108 arranged within thumb reach of the handle 10. Pin 106 is provided with a cross pin 110 to prevent accidental disconnection of the pin 106. Spring 92 exerts a pull on the pull line 96 for urging the end 112 of the lever 100 in the direction of the pin 106, which has its end located in a curvature 114 in the lever. An adjusting screw 116 is threaded through the mount 12 for determining the normal position of the lever 100 with respect to the tension of the spring 92.

Bar 56 carries a guide bar 116 which is shaped to extend across the run 118 of the line 34. The line guide 54 is in the nature of a spool rotatably mounted on the end of the bar 56. Guide bar 116 holds the line 34 in operative relation with the guide 54.

From the foregoing description of the various parts of the device, the operation thereof will be readily understood. Guide member 86 may be shifted to the position of Figure 3 at which time the openings in all the guide members of the line check are aligned for releasing the line. The line may be released by merely applying pressure on the head 108, which pressure causes the lever 100 to pivot for exerting a pull on the line 96 and shifting the member 86 in the direction of the head 24 against the tension of the spring 92. Spring 92 is of such tension as to immediately kick the member 86 to the position of Figure 2 immediately upon removal of pressure on the head 108. Thus the line 34 may be released in the motion of casting by merely applying pressure on the head 108.

To wind the line on the spool, it is merely necessary to rotate the gear 16 through the medium of the knob 74. Such rotation of the gear 16 imparts rotary motion to the spool 32, which in turn oscillates the bar 56 for shifting the line guide 54 longitudinally of the spool 32. Pinion 42 is of such diameter with respect to the gear 16 as to impart a rapid winding action on the line 34, while the mechanism is so designed as to minimize friction for casting purposes. Line check 82 operates in an efficient manner and is easily manipulated through the head 108 which is located within thumb reach of the handle 10.

Housing 28 includes a curved finger 120 which extends in the direction of the pinion 42. Finger 120 functions as a guide for the run 118 as it is shifted to the pinion end of the spool 32.

Without further elaboration, the foregoing w'll so fully illustrate my invention, that others may by applying current knowledge readily adapt the same for use under various conditions of service.

I claim:

1. A fishing reel comprising a handle, a mount carried by said handle, a rod, a bracket interconnecting the rod with said mount, a line spool, a gear rotatably mounted on said arm, a gear connected with said line spool and including means rotatably journaled in said mount, a line guide pivotally connected with said means, and an operating connection between said line guide and said first gear.

2. A fishing reel comprising a handle, a mount carried by said handle, a rod, a bracket interconnecting the rod with said mount, a line spool, a gear rotatably mounted on said mount, a gear connected with said line spool and including means rotatably journaled in said mount, a line guide pivotally connected with said means, an operating connection between said line guide and said first gear, a line check associated with said rod, and means connected with the line check and operable from a position adjacent the handle for releasing and checking the line.

3. A fishing reel comprising a handle, a mount carried by said handle, a rod, means interconnecting the rod with said mount, a line spool, a gear rotatably mounted on said mount, a gear connected with said line spool and including means rotatably journaled in said mount, a line guide pivotally connected with said first mentioned means, an operating connection between said line guide and said first gear, a line check associated with said rod, means connected with the line check and operable from a position adjacent the handle for releasing and checking the line, and a spool housing carried by said first mentioned means.

4. A fishing reel comprising a grip, a mount connected with the grip, a rod, said rod being carried by said mount, a gear rotatably journaled on said mount, a line spool, a gear connected with the line spool and arranged in mesh with said first gear, said second-named gear being rotatably journaled in said mount, a line guide for moving the line to and fro longitudinally of the line spool, an operating connection between the line guide and said first-named gear, a line check associated with said rod, said line check comprising two fixed elements having eyes for the reception of the line, a movable element positioned between the two members and having an eye for the reception of said line, resilient means for urging said element to a position for bringing its eye out of registration with the eyes in said members, a thumb actuated element located adjacent said grip, and an operating connection between the thumb actuated element and said element for moving the same, to bring its eye in registration with the eyes in said two members.

5. A fishing reel comprising a grip, a mount connected with the grip, a rod, said rod being carried by said mount, a gear rotatably journaled on said mount, a line spool, a gear connected with the line spool and arranged in mesh with said first gear, said second-named gear being rotatably journaled in said mount, a line guide for moving the line to and fro longitudinally of the line spool, an operating connection between the line guide and said first-named gear, a line check associated with said rod, said line check comprising two fixed elements having eyes for the reception of the line, a movable element positioned between the two members and having an eye for the reception of said line, resilient means for urging said element to a positiion for bringing its eye out of registration with the eyes in said members, a thumb actuated element located adjacent said grip, and an operating connection between the thumb actuated element and said element for moving the same, to bring its eye in registration with the eyes in said two members, a spool housing mounted on said mount, said spool housing including a slot for the reception of the line.

VINCENT J. KOLOSSO.